United States Patent
Lee

(10) Patent No.: US 8,599,657 B1
(45) Date of Patent: Dec. 3, 2013

(54) METHOD AND SYSTEM FOR PROVIDING ENERGY ASSISTED MAGNETIC RECORDING DISK DRIVE USING A DISTRIBUTED FEEDBACK LASER

(71) Applicant: Western Digital (Fremont), LLC, Fremont, CA (US)

(72) Inventor: Shing Lee, Daly City, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 0 days.

(21) Appl. No.: 13/846,802

(22) Filed: Mar. 18, 2013

Related U.S. Application Data

(62) Division of application No. 12/824,098, filed on Jun. 25, 2010, now Pat. No. 8,422,342.

(51) Int. Cl.
*G11B 11/00* (2006.01)

(52) U.S. Cl.
USPC .................. 369/13.33; 369/13.13; 29/603.02

(58) Field of Classification Search
USPC .......... 369/13.33, 13.13, 13.32, 13.02, 13.17, 369/112.09, 112.14, 112.21, 112.27, 300; 360/59; 385/129, 31, 88–94; 29/603.01–603.27; 250/201.3, 201.5
See application file for complete search history.

(56) References Cited

U.S. PATENT DOCUMENTS

| | | | |
|---|---|---|---|
| 8,012,804 B1 * | 9/2011 | Wang et al. | 438/110 |
| 8,024,748 B1 * | 9/2011 | Moravec et al. | 369/13.33 |
| 8,116,171 B1 * | 2/2012 | Lee | 369/13.33 |
| 8,125,856 B1 * | 2/2012 | Li et al. | 369/13.33 |
| 8,248,896 B1 * | 8/2012 | Yuan et al. | 369/13.33 |
| 8,477,571 B1 * | 7/2013 | Zhou et al. | 369/13.33 |
| 2010/0061018 A1 * | 3/2010 | Albrecht et al. | 360/135 |

* cited by examiner

*Primary Examiner* — Tan X Dinh

(57) ABSTRACT

A method and system for providing an energy assisted magnetic recording (EAMR) disk drive are described. The EAMR disk drive includes a media, a slider having a trailing face and an air-bearing surface (ABS), at least one distributed feedback (DFB) layer and EAMR transducer(s) on the slider. The DFB laser(s) each includes a plurality of quantum wells, a laser coupling grating, at least one reflector, and a cavity in the at least one DFB laser. The DFB laser(s) for providing energy to the media. The EAMR transducer(s) includes at least one waveguide, a write pole, at least one coil for energizing the write pole, at least one grating, and may include a near-field transducer. The grating(s) include a coupling grating for coupling the energy from the at least one DFB laser to the waveguide(s). The waveguide(s) direct the energy from the at least one grating toward the ABS.

9 Claims, 4 Drawing Sheets

Top View

Top View

METHOD AND SYSTEM FOR PROVIDING ENERGY ASSISTED MAGNETIC RECORDING DISK DRIVE USING A DISTRIBUTED FEEDBACK LASER

CROSS REFERENCE TO RELATED APPLICATIONS

This application is a divisional of U.S. patent application Ser. No. 12/824,098, filed on Jun. 25, 2010, which is hereby incorporated by reference in its entirety.

BACKGROUND

FIG. 1 depicts a side view of portion of a conventional energy assisted magnetic recording (EAMR) disk drive 10. The conventional EAMR disk drive 10 includes a recording media 12, a conventional slider 20, and a conventional laser diode 30 that are typically attached to a suspension (not shown). Other components that may be part of the conventional EAMR disk drive 10 are not shown. The conventional slider 20 is typically attached to the suspension at its back side 24. A conventional EAMR transducer 22 is coupled with the slider 20.

The conventional EAMR transducer 22 includes a grating (not separately shown) on the slider 20. Light from the conventional laser diode 30 is provided substantially along the optic axis 32 of the conventional laser diode 30 to the grating of conventional EAMR transducer 22. The light from the laser diode 30 is then provided to a waveguide. The waveguide directs the light toward the conventional media 12, heating a small region of the conventional media 12. The conventional EAMR transducer 22 magnetically writes to the conventional media 12 in the region the conventional media 12 is heated.

Although the conventional EAMR disk drive 10 may function, improvements in optical efficiency may be desired. Accurately placing the conventional slider 20 and conventional laser diode 30 may be difficult. As a result, misalignments may occur. Such misalignments may increase insertion loss of the laser light due, for example due to back reflections. Optical efficiency and, therefore, performance of the conventional EAMR disk drive 10 may suffer. In addition, manufacturing yield and/or manufacturing time may suffer. The conventional laser diode 30 also heats during use. This heat must be dissipated to allow adequate operation of the conventional laser diode 30 and the remaining portions of the conventional EAMR disk drive 10. Heat dissipation may become problematic for higher powers of the conventional laser diode 30. Thus, the conventional EAMR disk drive 10 may be high in cost, have lower than desired optical efficiency, inadequate heat dissipation, and may have manufacturability issues.

Accordingly, what is needed is a system and method for improving manufacturability and performance of an EAMR transducer.

BRIEF SUMMARY OF THE INVENTION

A method and system for providing an energy assisted magnetic recording (EAMR) disk drive are described. The EAMR disk drive includes a media, a slider having a trailing face and an air-bearing surface (ABS), at least one distributed feedback (DFB) laser and at least one EAMR transducer on the slider. The DFB laser(s) each includes a plurality of quantum wells, a laser coupling grating, at least one reflector, and a cavity in the at least one DFB laser. The DFB laser(s) for providing energy to the media. The EAMR transducer(s) includes at least one waveguide, a write pole, at least one coil for energizing the write pole, at least one grating, and may include a near-field transducer. The grating(s) include a coupling grating for coupling the energy from the at least one DFB laser to the waveguide(s). The waveguide(s) direct the energy from the at least one grating toward the ABS.

DETAILED DESCRIPTION OF THE PREFERRED EMBODIMENTS

Figure 1:
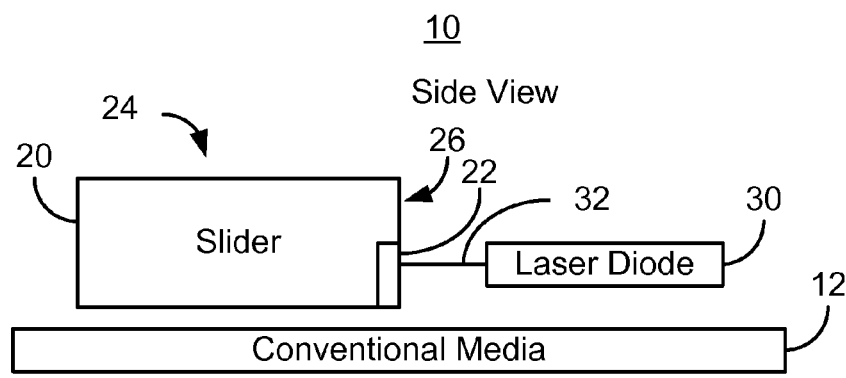
FIG. 1 depicts a side view of a conventional EAMR disk drive.
Figure 2:
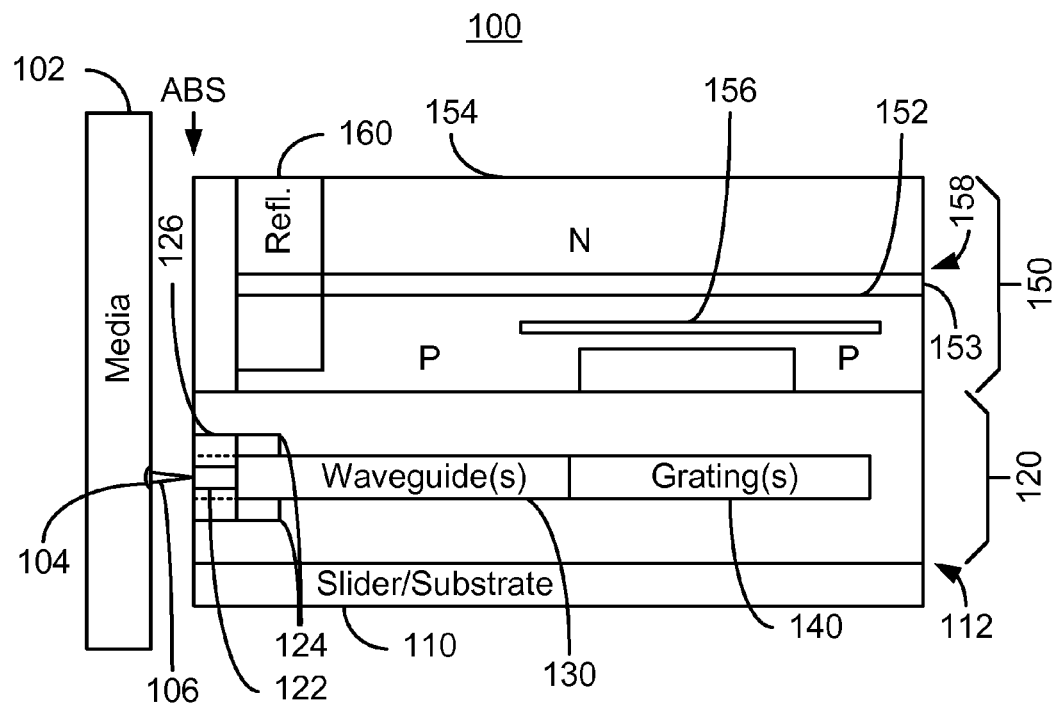
FIG. 2 depicts a side view of an exemplary embodiment of a portion of an EAMR disk drive.

FIG. 2 depicts a side view of an exemplary embodiment of a portion of an EAMR disk drive 100. For clarity, FIG. 2 is not to scale. For simplicity not all portions of the EAMR disk drive 100 are shown. In addition, although the EAMR disk drive 100 is depicted in the context of particular components other and/or different components may be used. For simplicity, only single components are shown. However, multiples of each component and their sub-components, might be used.

The EAMR disk drive 100 includes media 102, a slider 110/substrate having a trailing face 112 and an air-bearing surface (ABS) an EAMR transducer 120 and a distributed feedback (DFB) laser 150. Such lasers are also known as distributed Bragg reflector (DBR) lasers. Additional and/or different components may be included in the EAMR disk drive 100. For example, although not shown, the slider 110, and thus the DFB laser 150 and EAMR transducer 120 are generally attached to a suspension (not shown).

The EAMR transducer 120 includes a near-field transducer (NFT) 122, coils 124, pole 126, waveguide(s) 130 and grating(s) 140. Other components may also be included in the EAMR transducer 120, but are not shown for simplicity. For example, the transducer 120 may also include reflectors (not shown). In addition, components such as the NFT 122 might be omitted. The grating(s) 140 couple energy from the DFB laser 150. In some embodiments, the grating(s) 140 include surface coupling gratings as well as one or more reflective gratings. The surface coupling grating 140 couples energy from the laser 150 to the waveguide(s) 130. The reflective gratings may be used to reflect energy back toward the surface coupling grating 140 to improve optical efficiency of the EAMR disk drive 100. The waveguide(s) 130 direct the energy toward the ABS. In some embodiments, the waveguide(s) 130 also direct energy traveling away from the ABS. The NFT 122 may be used to focus the energy (shown as beam 106) onto the media 102, heating region 104. The EAMR transducer 120 may also include a reflector (not shown) between the grating(s) 140 and the substrate 110 as well as in proximity to the ABS.

The DFB laser 150 may be a surface emitting DFB laser. The DFB laser 150 is used to provide energy that is directed toward the media 102 and used in EAMR. The DFB laser 150 includes a P-region 152, N-region 154, laser coupling grating(s) 156, cavity 158, and reflector(s) 160. Quantum wells 153 are between the P-region 152 and N-region 154. The reflector(s) 160 may be a reflecting grating or a high reflective surface such as a mirror. In the embodiment shown in FIG. 2, only one reflector 160 is shown. However, in other embodiments, multiple reflectors may be used. The reflector 160 reflects energy traveling toward the ABS back toward the laser coupling grating 156. An additional reflector (not shown) may reflect energy traveling away from the ABS back toward the laser coupling grating 156. Another reflector (not shown) may reflect energy traveling away from the substrate 110 back toward the coupling grating 156. The laser coupling grating 156 may be a surface coupling grating that couples energy toward the grating(s) 140 of the transducer 120.

In order to write to the media 102, the DFB laser 150 generates optical energy which is coupled toward the EAMR transducer 120 via laser surface coupling grating 156. The surface coupling grating(s) 140 couple energy from the DFB laser 150 to the waveguide(s) 130. The waveguide 130 directs the energy toward the ABS and, therefore, the NFT 122. The NFT 122 focuses energy 106 to a spot on the media. The energy 106 heats a region 104 of the media 102. The energy may be in the form of a light or other electromagnetic beam from the EAMR head 120. The heated region 106 is typically larger than the size of the optical spot developed by the energy 106 on the media 102. The poles 126 may be energized by the coil(s) 124, magnetically writing to the region 104.

Using the EAMR disk drive 100, performance may be enhanced while costs are reduced. The cavity 158 of the DFB laser 150 is laid out horizontally with respect to the trailing edge 112 of the substrate 112. Thus, the DFB laser 150 may be capable of reliably providing a relatively high power while allowing for improved heat dissipation. The conversion efficiency of the laser coupling gratings 156 may be high, particularly where reflectors 160 are used. Further, reflectors may be provided to reflect energy traveling toward and away from the substrate 110 (e.g. substantially perpendicular to the waveguide 130). Thus, a cross cavity including the coupling grating 140 of the transducer may also be formed. Much of the energy generated by the laser 150 is either coupled out through the gratings 156 and 140 or remains in the cavity 158 to continue lasing of the DFB laser 150. Thus, the conversion efficiency of the EAMR disk drive 100 may be high. The DFB laser 150 may also exhibit reduced temperature sensitivity for laser wavelength. Stated differently, the wavelength of light provided by the DFB laser 150 is somewhat insensitive to temperature. Further, mounting the DFB laser 150 may be accomplished using wafer level integration. Thus, a high degree of precision in alignment is possible. Thus, higher manufacturing volume, higher yield, improved reliability of the DFB laser 150, and lower production cost may be achieved. In addition, the bonding of the DFB laser 150 to the slider 110 may result in a seal being formed between the slider 110 and the interior of the DFB laser 150. Reliability of the DFB laser 150 may thus be enhanced.

Figure 3:
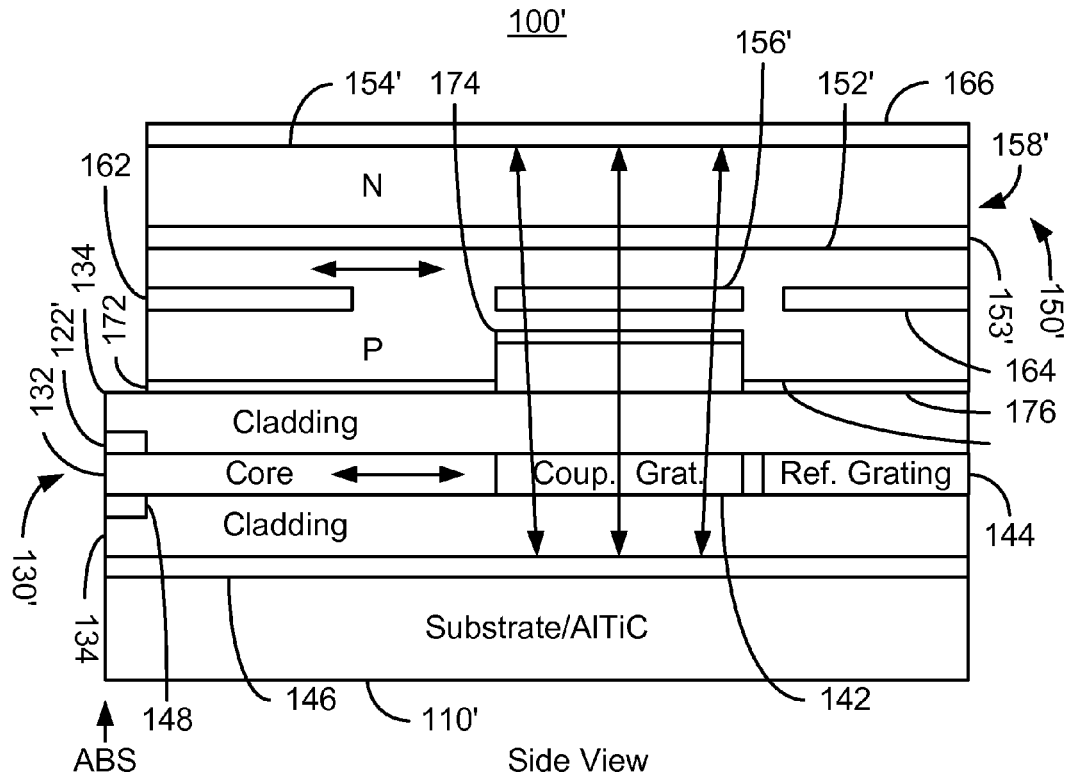
FIG. 3 depicts top and side views of an exemplary embodiment of a portion of an EAMR disk drive.
Figure 3:
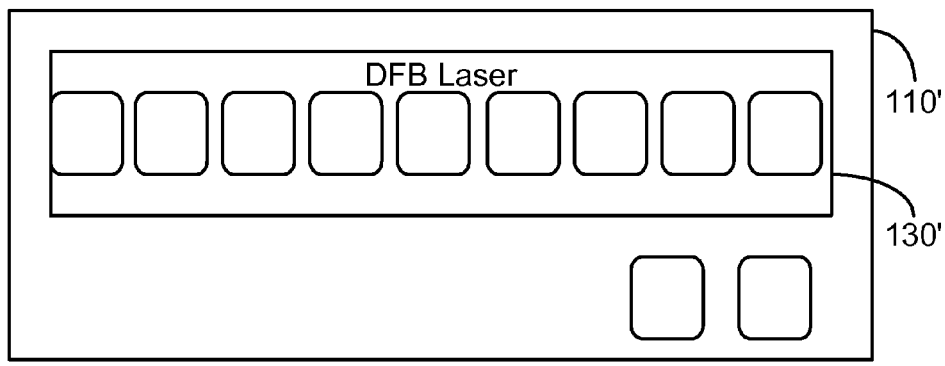

FIG. 3 depicts top and side views of an exemplary embodiment of a portion of an EAMR disk drive 100'. FIG. 3 is not to scale. Although the EAMR disk drive 100' is depicted in the context of particular components additional, other and/or different components may be used. Referring to FIGS. 2-3, the EAMR disk drive 100' is analogous to the EAMR disk drive 100. Consequently, the EAMR disk drive 100' includes a substrate 110', a transducer 120', and a DFB laser 150' that are analogous to the slider 110, EAMR head 120, and DFB Laser 150, respectively. For clarity, only a portion of the EAMR disk drive 100' is shown. For example, media 102, spot 104, coils 124, poles 126 and the suspension to which the slider 110' is generally attached are not depicted. The direction of travel of light in FIG. 3 is shown be two-sided arrows.

The EAMR transducer 120' includes an NFT 122', waveguide 130', gratings 142 and 144, and reflectors 146 and 148. The NFT 122' may be used to focus the energy onto the media (not shown in FIG. 3). Together, the gratings 142 and 144 may be considered to correspond to the grating 140 depicted in FIG. 2. Referring back to FIG. 3, other components may also be included in the EAMR transducer 120', but are not shown for simplicity.

The waveguide 130' includes core 132 and cladding 134. The waveguide 130' directs energy to the ABS. In some embodiments, which include reflector 148, the waveguide 130' may also direct energy away from the ABS. The surface coupling grating 142 couples energy from the DFB laser 150' to the waveguide 130'. The reflecting grating 144 reflects light traveling away from the ABS back toward the surface coupling grating 142 to improve optical efficiency of the EAMR disk drive 100'. The reflector 146, which may be a mirror or other highly reflective surface, reflects energy traveling toward the substrate 110' back toward the DFB laser 150'. The reflector 148 redirects energy traveling toward the ABS and not focused to the media (not shown) by the NFT 122' back toward the coupling grating 142.

The DFB laser 150' may be a surface emitting DFB laser. The DFB laser 150' is used to provide energy that is directed toward the media (not shown). The DFB laser 150' includes a P-region 152', N-region 154', quantum wells 153', laser coupling grating 156', cavity 158', and reflector(s) 162, 164, and 166, and antireflective coating 173, 174, and 176. Components 152', 153', 154', 156', and 158' correspond to components 152, 153, 154, 156, and 158. Thus, the laser coupling grating 156' is a surface coupling grating that couples energy toward the grating 142 of the transducer 120'. The reflector 162 may be a grating or a high reflective surface such as a mirror. The reflector 162 reflects energy traveling toward the ABS back toward the laser coupling grating 156'. Similarly, the reflector 164 may be a grating or a high reflective surface, such as a mirror. The reflector 164 reflects energy traveling away from the ABS back toward the laser coupling grating 156'. The reflector 166 may be a mirror and reflects energy traveling away from the substrate 110' back toward the laser coupling grating 142. Thus, energy may travel in the disk drive 100' in the direction shown by the two-sided arrows within the DFB laser 150' and EAMR transducer 120'.

In operation, the cavity 158', which may be formed between the reflecting gratings 162 and 164, is used to generate optical energy. The reflector 146 in the transducer 120' and the reflector 166 in the DFB laser 150' reflect light traveling between the reflectors 146 and 166. Thus, an additional, cross cavity may be considered to be formed by the combination of the DFB laser 150' and the transducer 120'. The laser surface coupling grating 156' couples light generated by the laser 150' to the surface coupling grating 142. The surface coupling grating 142 couples light to the waveguide 130'. The waveguide 130' directs the energy toward the ABS and, therefore, the NFT 122'. The NFT 122' focuses energy to a spot on the media (not shown). In some embodiments, some of the light carried via the waveguide 130' to the ABS and not focused by the NFT 122' is reflected, for example by the reflector 148. The reflected light may travel back along the waveguide 130', away from the ABS. Light may be coupled back into the DFB laser 150' via the laser coupling grating 142. In addition, light reaching the reflecting grating 144 may be reflected back along the waveguide 130' to the ABS or to the coupling grating 142. Thus, light may be recycled in the cavity 158' and the cross cavity formed between the reflectors 146 and 166. Light may also be coupled to the NFT 122' and used to write to the media (not shown).

Using the EAMR disk drive 100', performance may be enhanced while costs are reduced and manufacturability improved. As discussed above, the DFB laser 150' may be capable of reliably providing a relatively high power while allowing for improved heat dissipation. Because of the reflectors 162, 164, and 166, the conversion efficiency of the coupling gratings 140' and 156' may be high. Much of the energy generated by the laser 150 is either coupled out through the gratings 156' and 142 or returns to the cavity 158' to continue lasing of the DFB laser 150'. Thus, the conversion efficiency of the EAMR disk drive 100 may be high. The DFB laser 150' may also exhibit a reduced temperature sensitivity for laser wavelength. Further, mounting the DFB laser 150' may be accomplished using wafer level integration. Thus, a high degree of precision in alignment is possible. Thus, higher manufacturing volume, higher yield, improved reliability of the DFB laser 150', and lower production cost may be achieved. In addition, the bonding of the DFB laser 150' to the slider 110' may result in a seal being formed between the slider 110' and the interior of the DFB laser 150'. Reliability of the DFB laser 150' may thus be enhanced.

Figure 4:
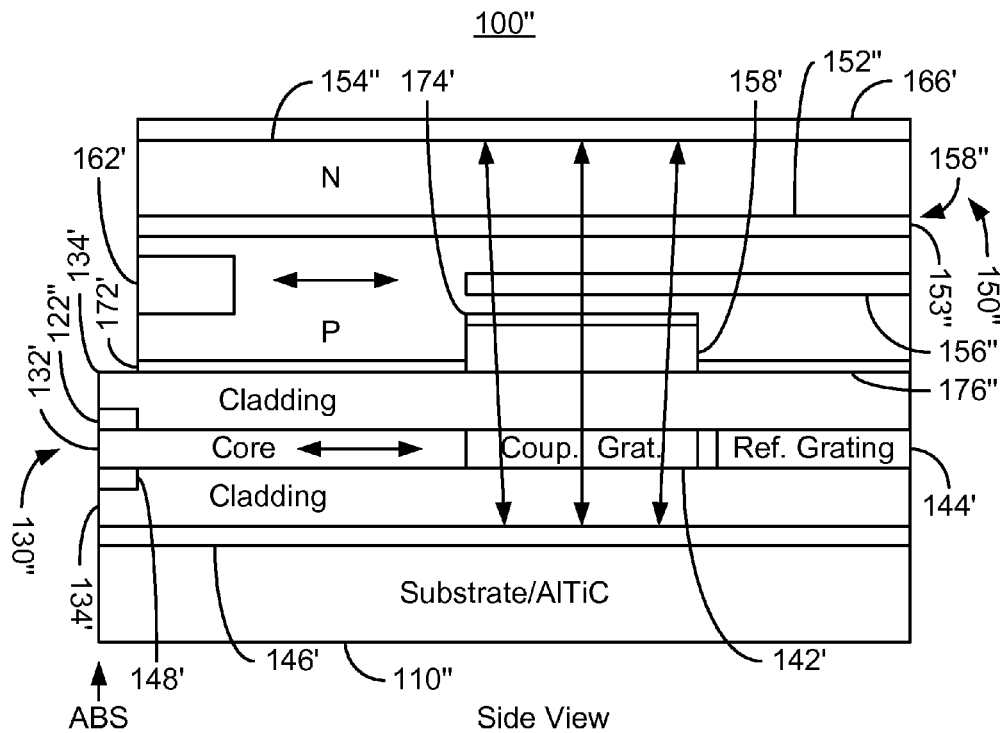
FIG. 4 depicts top and side views of an exemplary embodiment of a portion of an EAMR disk drive.
Figure 4:
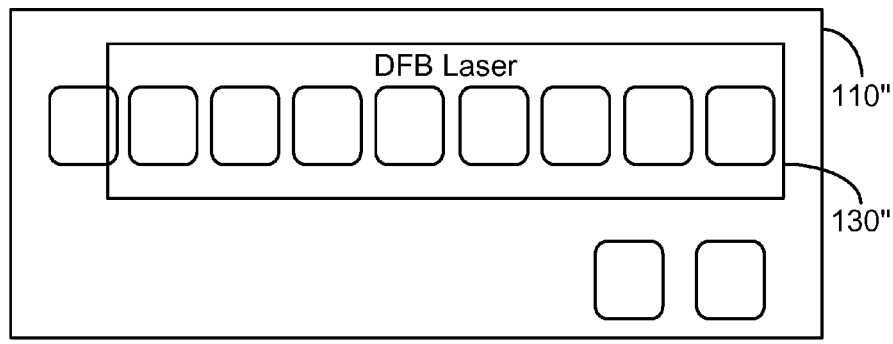

FIG. 4 depicts top and side views of an exemplary embodiment of a portion of an EAMR disk drive 100". FIG. 4 is not to scale. Although the EAMR disk drive 100" is depicted in the context of particular components additional, other and/or different components may be used. Referring to FIGS. 2-4, the EAMR disk drive 100" is analogous to the EAMR disk drives 100 and 100'. Consequently, the EAMR disk drive 100" includes a substrate 110", a transducer 120", and a DFB Laser 150" that are analogous to the slider 110/110', EAMR head 120/120', and DFB Laser 150/150', respectively. For clarity, only a portion of the EAMR disk drive 100" is shown. For example, media 102, spot 104, coils 124, poles 126 and the suspension to which the slider 110" is generally attached are not depicted. The direction of travel of light in FIG. 4 is shown be two-sided arrows.

The EAMR transducer 120" includes an NFT 122", waveguide 130", gratings 142' and 144', and reflectors 146' and 148'. The EAMR transducer 120" is analogous to the transducer 120' and thus includes analogous components having similar functions. The NFT 122" may be used to focus the energy onto the media (not shown in FIG. 4). Together, the gratings 142' and 144' may be considered to correspond to the grating 140 depicted in FIG. 2. Referring back to FIG. 4, other components may also be included in the EAMR transducer 120", but are not shown for simplicity.

The waveguide 130" includes core 132' and cladding 134'. The waveguide 130" directs energy to the ABS. In some embodiments, which include reflector 148', the waveguide 130" may also direct energy away from the ABS. The surface coupling grating 142' couples energy from the DFB laser 150" to the waveguide 130". The reflecting grating 144' reflects light traveling away from the ABS back toward the surface coupling grating 142' to improve optical efficiency of the EAMR disk drive 100". The reflector 146', which may be a mirror or other highly reflective surface, reflects energy traveling toward the substrate 110" back toward the DVB laser 150'. The reflector 148' redirects energy traveling toward the ABS and not focused to the media (not shown) by the NFT 122" back toward the coupling grating 142'.

The DFB laser 150" may be a surface emitting DFB laser. The DFB laser 150" is used to provide energy that is directed toward the media (not shown) and is analogous to the DFB lasers 150 and 150'. Thus, the DFB laser 150" has analogous structures having similar functions as the DFB lasers 150 and 150'. The DFB laser 150" includes a P-region 152", N-region 154", quantum wells 153", laser coupling grating 156", cavity 158", and reflector(s) 162', 164', and 166', and antireflective coating 173', 174', and 176'. Components 152", 153", 154", 156", and 158" correspond to components 152/152', 153/153', 154/154', 156/156', and 158/158'. The reflector 162' may be a grating or a high reflective surface such as a mirror. The reflector 162' reflects energy traveling toward the ABS back toward the laser coupling grating 156". The reflector 166' may be a mirror and reflects energy traveling away from the substrate 110" back toward the laser coupling grating 142'. Thus, energy may travel in the disk drive 100" in the direction shown by the two-sided arrows within the DFB laser 150" and EAMR transducer 120".

However, the laser coupling grating 156" is a second order surface coupling grating that couples energy toward the grating 142' of the transducer 120'. The second order surface coupling grating 156" also functions as a reflector. Thus, the second order surface coupling grating 156' also reflects energy traveling away from the ABS. Thus, the second order surface coupling grating 156" both couples optical energy to the coupling grating 142', but also reflects optical energy back toward the ABS.

In operation, the disk drive 100" functions in a manner analogous to the disk drive 100'. However, the cavity 158' formed between the reflecting gratings 162 and second order surface coupling grating 156" is used to generate optical energy. An additional, cross cavity may be considered to be formed by the combination of the DFB laser 150" and the transducer 120". The laser surface coupling grating 156" couples light generated by the DFB laser 150'" to the surface coupling grating 142'. The surface coupling grating 142' couples light to the waveguide 130". The waveguide 130" directs the energy toward the ABS and, therefore, the NFT 122". The NFT 122" focuses energy to a spot on the media (not shown). In some embodiments, some of the light carried via the waveguide 130" to the ABS and not focused by the NFT 122" is reflected, for example by the reflector 148'. Light may be coupled back into the DFB laser 150" via the laser coupling grating 142'. In addition, light reaching the reflecting grating 144' may be reflected back along the waveguide 130" to the ABS or to the coupling grating 142'. Thus, light may be recycled in the cavity 158" and the cross cavity formed between the reflectors 146' and 166'. Light may also be coupled to the NFT 122' and used to write to the media (not shown).

The EAMR disk drive 100" provides analogous benefits to the EAMR disk drives 100 and 100'. Performance of the EAMR disk drive 100" may be enhanced while costs are reduced and manufacturability improved. As discussed above, the DFB laser 150" may be capable of reliably providing a relatively high power while allowing for improved heat dissipation. The conversion efficiency of the EAMR disk drive 100" may also be high. The DFB laser 150" may also exhibit a reduced temperature sensitivity for laser wavelength. A high degree of precision in alignment is also possible. Thus, higher manufacturing volume, higher yield, improved reliability of the DFB laser 150", and lower production cost may be achieved. In addition, the bonding of the DFB laser 150" to the slider 110" may result in a seal being formed between the slider 110" and the interior of the DFB laser 150". Reliability of the DFB laser 150" may thus be enhanced.

Figure 5:
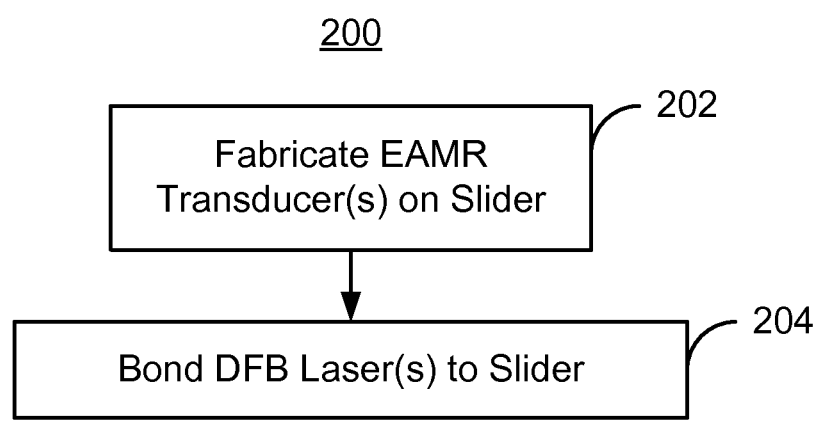
FIG. 5 depicts an exemplary embodiment of a method of forming a portion of an EAMR disk drive.

FIG. 5 depicts an exemplary embodiment of a method 200 of forming a portion of an EAMR disk drive. For simplicity, some steps may be omitted, combined, replaced, performed in another sequence, and/or interleaved. The method 200 is described in the context of the EAMR disk drives 100/100'/100". However, the method 200 may be used for other EAMR disk drives. The method 200 also may commence after formation of some portions of the EAMR disk drive 100/100'/100". The method 200 is also described in the context of providing a single disk drive. However, the method 200 may be used to fabricate multiple disk drives at substantially the same time. The method 200 also utilizes slider/substrate 110/110'/110".

The EAMR transducers 110/110'/110" are provided on the slider, via step 202. Step 202 includes fabrication of components of the transducers 110/110'/110". For example, the components 122/122'/122", 130/130'/130", 132/132', 134/134', 140, 142/142', 144/144', 146/146', and 148/148' may be provided. Thus, the desired EAMR transducer 110/110'/110" may be provided.

The DFB laser(s) 150/150'/150" are provided and bonded to the head, via step 202. In some embodiments, step 202 may include fabricating the DFB laser 150/150'/150". For example, the DFB lasers 150/150'/150" may be ordered to spec or fabricated. The lasers are then aligned with the transducers 110/110'/110" and bonded to the sliders 110/110'/110".

Thus, using the method 200, the disk drives 100/100'/100" may be provided. As a result, the benefits of the disk drives 100/100'/100" may be achieved.

I claim:

1. A method for providing an energy assisted magnetic recording (EAMR) disk drive including a media and a slider having a trailing face and an air-bearing surface (ABS), the method comprising:
    fabricating at least one EAMR transducer on the slider, the at least one EAMR transducer including at least one waveguide, a write pole, at least one coil for energizing the write pole, least one grating including a coupling grating and a first mirror; and
    bonding at least one distributed feedback (DFB) laser to the slider, the at least one EAMR transducer residing between the at least one DFB laser and the slider, the at least one DFB laser including a plurality of quantum wells, a second mirror, a laser coupling grating, at least one reflector, and a cavity in the at least one DFB laser, the plurality of quantum wells residing between the second mirror and the cavity, the at least one DFB laser for providing energy to the media, the coupling grating for coupling the energy from the at least one DFB laser to the at least one waveguide, the at least one waveguide directing the energy from the coupling grating toward the ABS and residing between the first mirror and the cavity.

2. The method of claim 1 wherein at least one grating further includes a reflecting grating, the coupling grating residing between the ABS and the reflecting grating.

3. The method of claim 1 wherein the at least one reflector includes first reflecting grating between the ABS and the laser coupling grating and a second reflecting grating, the laser coupling grating residing between the second reflecting grating and the ABS.

4. The method of claim 1 wherein the laser coupling grating is a second order surface couple grating.

5. The method of claim 4 wherein the at least one reflector further includes at least one of a mirror and a reflecting grating residing between the ABS and the laser coupling grating.

6. The method of claim 1 wherein the laser coupling grating is a first surface couple grating and wherein the coupling grating is a second surface couple grating.

7. The method of claim 1 wherein the step of fabricating the at least one EAMR transducer further includes:
    providing a near-field transducer (NFT) for focusing the energy from the at least one waveguide onto the media.

8. The method of claim 1 wherein the waveguide further directs reflected energy from the ABS to the coupling grating.

9. The method of claim 1 wherein the at least one DFB laser further includes an antireflective coating residing at an edge of the cavity.

* * * * *